No. 684,125. Patented Oct. 8, 1901.
W. STRADER.
END GATE.
(Application filed Apr. 18, 1901.)
(No Model.)
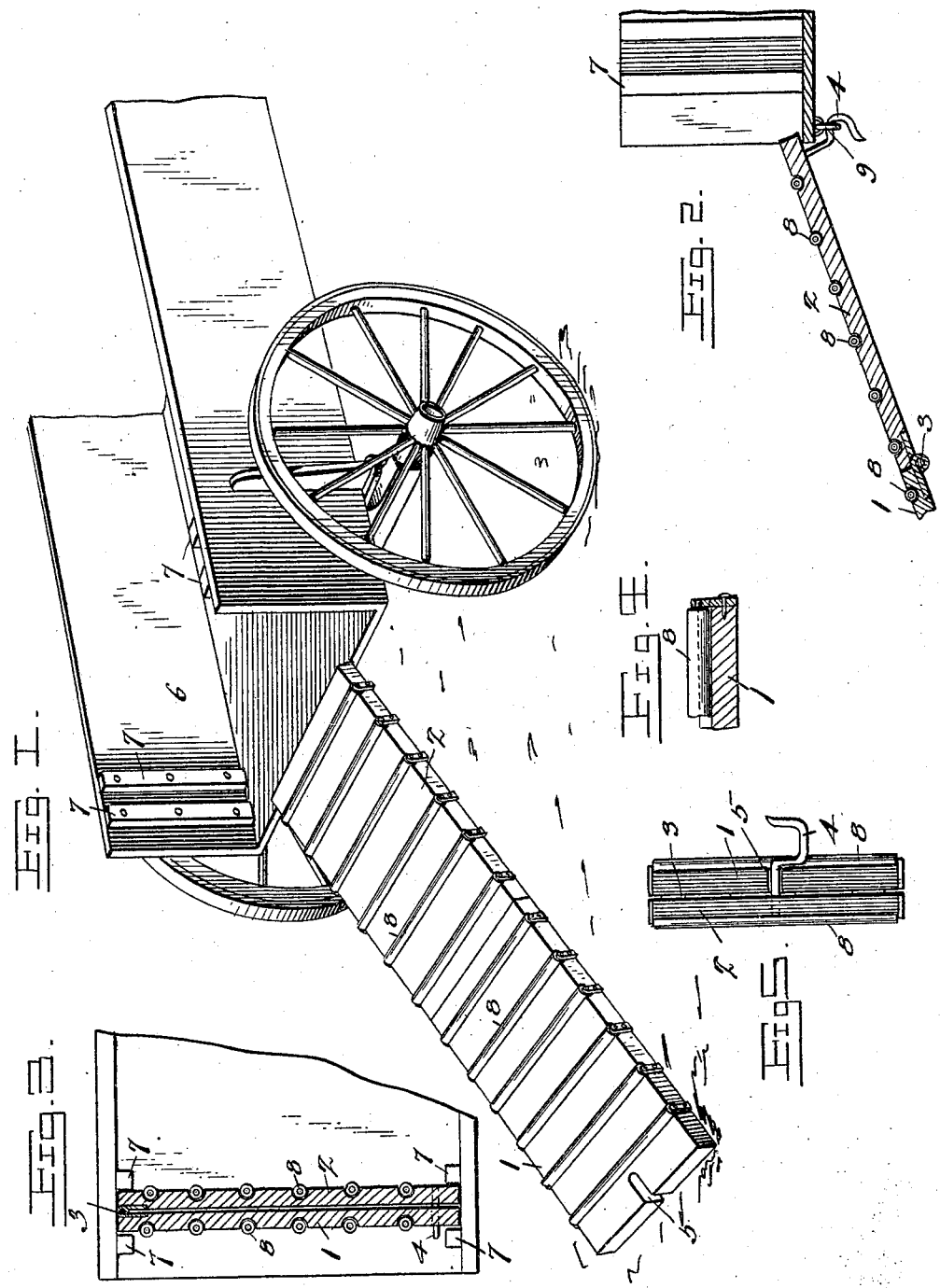
Witnesses
F. E. Alden
J. F. Riley
W. Strader Inventor
by C. A. Snow & Co.
Attorneys

UNITED STATES PATENT OFFICE.

WILLIAM STRADER, OF CLINTON, IOWA.

END-GATE.

SPECIFICATION forming part of Letters Patent No. 684,125, dated October 8, 1901.

Application filed April 18, 1901. Serial No. 56,475. (No model.)

*To all whom it may concern:*

Be it known that I, WILLIAM STRADER, a citizen of the United States, residing at Clinton, in the county of Clinton and State of Iowa, have invented a new and useful End-Gate, of which the following is a specification.

The invention relates to improvements in end-gates.

The object of the present invention is to improve the construction of end-gates and to provide a simple, inexpensive, and efficient device adapted to be readily arranged to form a skid for enabling heavy packages and the like to be conveniently unloaded from a vehicle.

The invention consists in the construction and novel combination and arrangement of parts hereinafter fully described, illustrated in the accompanying drawings, and pointed out in the claims hereto appended.

In the drawings, Figure 1 is a perspective view of a device constructed in accordance with this invention and shown applied to a portion of a wagon and arranged to form a skid. Fig. 2 is a longitudinal sectional view of the same. Fig. 3 is a horizontal sectional view, the device being arranged to form an end-gate. Fig. 4 is a detail sectional view illustrating the manner of mounting the antifriction-rolls. Fig. 5 is an end view of the end-gate, illustrating the manner of locking the sections together.

Like numerals of reference designate corresponding parts in all the figures of the drawings.

1 and 2 designate sections or boards adapted to be folded back to back, as illustrated in Figs. 3 and 5, to form an end-gate and capable of being unfolded and arranged as illustrated in Fig. 1 for unloading heavy articles from a vehicle. The sections 1 and 2 are connected at one end of the end-gate by suitable hinges 3, and they are detachably secured together, as illustrated in Fig. 3, by means of a hook 4, located at the other end of the endgate, and pivotally mounted on the section 2 and extending through a slot or bifurcation 5 of the other section 1. The hook has an extended shank which is journaled on the inner section 2, and the engaging portion of the hook is adapted to be arranged either longitudinally of the slot 5 or transversely thereof. When the engaging portion of the hook is arranged transversely of the slot, it projects beyond the same and locks the sections 1 and 2 together; but when it is arranged longitudinally of the slot it is adapted to be readily passed through the same to permit the sections to be opened.

The end-gate, which may be mounted on a wagon-body 6 in any suitable manner, is preferably arranged in ways formed by vertical cleats 7, secured to the inner faces of the sides of the body. The sections 1 and 2 are provided with transverse antifriction-rolls 8, located at the outer faces of the sections when the latter are folded and at the upper faces of the sections when the same are arranged to form a skid. The transverse rolls, which preferably extend entirely across the sections, may be of any other desired construction and may be mounted on the sections in any suitable manner.

The skid is designed to be arranged, as shown in Fig. 1, with its upper end resting upon the bottom of the body, and the inner adjacent ends of the sections abut against each other, the hinges being at the lower face of the skid. In order to prevent the skid from dropping from the vehicle should the latter be accidentally drawn forward by the draft-animals, the body is provided with a ring 9, which is arranged to be engaged by the hook 4. It will thus be seen that the hook performs the double function of locking the sections in their closed position and of securing the skid to the vehicle.

It will be seen that the combined skid and end-gate is exceedingly simple and inexpensive in construction, that it is adapted to be readily arranged to form either a skid or an end-gate, and that the fastening device holds the sections together and secures the skid to a wagon.

What I claim is—

1. A device of the class described comprising the two sections 1 and 2 hinged together at one end and adapted to fold on each other to form an end-gate and capable of being unloaded to form a skid, and a fastening device arranged at the other ends of the sections and connecting the same, and adapted to secure the device to a vehicle, substantially as described.

2. A combined end-gate and skid composed of two sections hinged at one end and adapted to fold back to back to form an end-gate and designed to be arranged between the sides of a wagon-body in the usual manner, said sections being adapted to be unfolded to form a skid, substantially as described.

3. The combination with a vehicle, of a combined end-gate and skid composed of two sections hinged together at one end, one of the sections being provided at its other end with a slot, and a hook mounted on the other section and arranged adjacent to the slot when the sections are folded, said hook being adapted to be rotated to arrange it longitudinally of the slot and transversely of the same and being also adapted to engage the vehicle, substantially as described.

4. The combination with a vehicle provided with ways, of a combined end-gate and skid composed of two sections hinged together at one end and adapted to be folded back to back to fit in the said ways, and antifriction-rolls mounted on the sections and arranged at the outer faces of the same when the sections are folded and at the upper faces of the sections when the latter are arranged to form a skid, substantially as described.

In testimony that I claim the foregoing as my own I have hereto affixed my signature in the presence of two witnesses.

WILLIAM STRADER.

Witnesses:
CHAS. H. JUDEL,
W. H. CARROLL.